UNITED STATES PATENT OFFICE.

ARTHUR FIELDING, OF SALFORD, ENGLAND.

PRODUCTION OF DEXTRIN, BRITISH GUMS, AND THE LIKE.

979,753. Specification of Letters Patent. Patented Dec. 27, 1910.

No Drawing. Application filed October 10, 1910. Serial No. 586,388.

*To all whom it may concern:*

Be it known that I, ARTHUR FIELDING, a subject of the King of Great Britain, residing at George Street, Salford, in the county of Lancaster, England, have invented new and useful Improvements in the Production of Dextrin, British Gums, and the Like, of which the following is a specification.

My invention relates to improvements in the production of dextrin, British gums and the like.

After careful study of the literature relating to starch and its modifications, I have failed to find any material deviation from the recognized method in which acids and the like are utilized as aids in the conversion by heat of starch to the more or less soluble bodies recognized by various trade names as dextrin, British gums and the like.

In effect hitherto the various expediting agents have been added to the starch at the best in the condition in which it is marketed, *i. e.*, with a minimum water content of say fifteen per cent. and rising in some cases even to twenty per cent. Even this high water content in some of the best processes is increased by the addition of water to the "chemical" so as to insure in distribution more intimate contact between the starch granules and the active expediting agent of conversion be such either acid or alkali.

I am aware that processes have been proposed for the dosing of the starch with the acid &c. by the vapors thereof in lieu of the liquid additions; but in these processes the starch has been operated upon while charged with its original water content more or less intact.

I am further aware that the words "dry starch" have been used in the specifications of various patented processes for the manufacture of dextrin, British gums and the like, but to the best of my knowledge and belief such words have only been used in the conventional sense to designate commercial starch having a water content of say fifteen per cent. and upward and especially in some cases to differentiate processes where weak acids (*i. e.* acid diluted with water) are added to commercial starch thereby increasing the existing water content in contradistinction to processes which have been attempted with vaporized acid. I now employ the words "dried starch" to designate a starch subjected to an efficient drying process to the extent that when a sample of such dried starch be subjected to a temperature of two hundred and twelve degrees Fahrenheit its weight will remain practically constant.

After careful observation and experiment I have discovered that for the preparation of the most perfect dextrin or the like in which on boiling, the requisite fluidity shall be obtained with the minimum variation in color from the original starch and the retention of the desired quality of gumminess, it is essential that the starch shall be "stoved" at a temperature sufficiently high to drive off practically all the fifteen per cent. to twenty per cent. water content, but not so high as to commence torrefication.

In practice I find it convenient to handle quantities of about two tons commercial raw starch, and I charge this quantity into shallow trays of say galvanized iron, each tray having a layer of starch of about two inches in depth. The trays so charged are placed on racks inside a drying chamber, which is preferably circular so giving facility for the trays to be arranged on a spider rack, the central pillar or shaft of which is held in position in suitable bearings so as to allow for rotation by suitable gearing if desired. The drying chamber is heated in any convenient way so as to obtain a regulated temperature, and the ventilation and drying may be assisted by a fan or other appliance. A convenient temperature I have found to be from one hundred and sixty to one hundred and eighty degrees Fahrenheit. The drying operation is continued to insure that the starch, which at start had a water content of about fifteen per cent. or upward, will be withdrawn with the water content practically eliminated as evidenced when a sample of such dried starch retains a practically constant weight when exposed to a temperature of two hundred and twelve degrees Fahrenheit. Having reduced the starch to this satisfactory condition of dryness the subsequent process of conversion into dextrin or the like can be conveniently effected in the apparatus described by me in the specification to my prior British Patent No. 20,488 of 1906 or in any other convenient and suitable apparatus, viz. the "chemical" is added either with or without the addition of superheated steam, in the state of gas vapor or sprayed solution.

Prior to the addition of the "chemical" the dried starch is, if necessary, gradually raised from the initial charging temperature to the temperature necessary for complete conversion, such temperature varying of course according to the result desired.

What I claim as my invention and desire to secure by Letters Patent is:—

1. The production of dextrin, British gums and the like, at a comparatively low temperature by the action of dextrinating agents upon dried starch from which the water content has been practically eliminated, substantially as herein described.

2. Dextrin, British gums and the like, produced at a comparatively low temperature by the action of dextrinating agents upon dried starch from which the water content has been practically eliminated, substantially as herein described.

In testimony whereof I have signed my name to this specification in the presence of two subscribing witnesses.

ARTHUR FIELDING.

Witnesses:
S. W. GILLETT,
HERBERT ROWLAND ABBEY.